(12) United States Patent　(10) Patent No.: US 6,880,165 B2
Sugawara　(45) Date of Patent: Apr. 12, 2005

(54) OBJECTIVE LENS DRIVING UNIT WITH CONNECTING MEMBERS DISPLACED IN EXTENDING DIRECTION OF SUSPENSION WIRES

(75) Inventor: Makoto Sugawara, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 263 days.

(21) Appl. No.: 10/361,313

(22) Filed: Feb. 10, 2003

(65) Prior Publication Data

US 2003/0161252 A1 Aug. 28, 2003

(30) Foreign Application Priority Data

Feb. 25, 2002 (JP) ........................................ 2002-048488

(51) Int. Cl.⁷ ........................... G11B 7/08; G11B 7/085; G11B 7/09
(52) U.S. Cl. ..................................................... 720/685
(58) Field of Search ................................ 720/685, 683, 720/682, 681, 672, 659, 658; 369/244.1

(56) References Cited

U.S. PATENT DOCUMENTS 5,373,496 A　*　12/1994　Tomita et al. ............... 720/682
6,259,671 B1　*　7/2001　Shibusaka .................... 720/681

* cited by examiner

Primary Examiner—Julie Anne Watko
(74) Attorney, Agent, or Firm—Hogan & Hartson, LLP

(57) ABSTRACT

In an optical pickup system, at least two suspension wires support a lens holder on which an objective lens and driving coils are mounted. The suspension wires are respectively secured on opposite surfaces of the lens holder. The lens holder has connecting members, an end of each winding for the driving coils is wound around one of the connecting members, and a tip of each of the suspension wires comes into contact with the corresponding connecting member. The connecting members are positioned in such a manner as to be displaced apart from each other in the extending direction of the suspension wires.

6 Claims, 3 Drawing Sheets

OBJECTIVE LENS DRIVING UNIT WITH CONNECTING MEMBERS DISPLACED IN EXTENDING DIRECTION OF SUSPENSION WIRES

BACKGROUND OF THE INVENTION

1. Field of the Invention

The present invention relates to an optical pickup system for incorporation into a CD player or the like, and, in particular, to an objective lens driving unit.

2. Description of the Related Art

FIG. 1 is a perspective view illustrating an example objective lens driving unit according to a related art. Referring to FIG. 1, a lens holder 1 holds an objective lens 2 thereon. The lens holder 1 is molded integrally with support members 4 on opposite (left and right) surfaces thereof. Suspension wires 3a and 3b are secured to each of the support members 4. The support member 4 on each surface is provided with vertically arranged insertion holes 4a and 4b, into which the suspension wires 3a and 3b are inserted. The suspension wires 3a and 3b as inserted into the insertion holes 4a and 4b are adhered thereto.

Connecting members 5a and 5b are molded integrally with the lens holder 1 so as to be positioned adjacent to the suspension wires 3a and 3b which are inserted into the insertion holes 4a and 4b and extend therefrom. The connecting members 5a and 5b are also installed aligned along a direction orthogonal to the extending direction of the suspension wires. One end of each of the conductors for driving coils for moving the lens holder is wound around connecting members 5a and 5b. A focusing coil 6 and tracking coils 7a and 7b orthogonal to the focusing coil 6 are provided on the lens holder 1 as driving coils.

The suspension wires 3a and 3b are soldered to the connecting members 5a and 5b around which an end of the winding for each driving coil is wound so as to allow electric power to be supplied to the driving coils.

Various components are mounted on a base 8 formed from steel plate. On the base 8 is provided an integrally-molded mounting part 8a. A securing member 9 for securing the second end of each of the suspension wires 3a and 3b is secured to the mounting part 8a using a screw 11. The lens holder 1 is thus supported relative to the base 8 with the suspension wires. The suspension wires 3a and 3b are soldered on a printed circuit board 10 which is adhered to the securing member 9. A damping material is used to fill the inside of each cavity 9a formed within the securing member 9, thereby partially damping the vibration of the suspension wires 3a and 3b.

Magnets 11a and 11b are placed so as to sandwich the tracking coils 7a and 7b which are provided on the lens holder 1, and such that opposite poles face each other. The magnets 11a and 11b are attached to mounting parts 8b and 8c, respectively, using an adhesive. The mounting parts 8b and 8c are molded integrally with the base 8.

An assembly process for assembling the optical pickup system shown in FIG. 1 will be described. The objective lens 2, the focusing coil 6, and the tracking coils 7a and 7b are pre-mounted on the lens holder 1. Ends of the winding for the focusing coil 6 and of the winding for the tracking coils 7a and 7b are wound around the connecting members 5a and 5b, respectively. Using a jig, the suspension wires 3a and 3b are inserted into and through respective holes 10a and 10b which are provided on the printed circuit board 10, passed through respective cavities 9a, and then inserted into the insertion holes 4a and 4b, respectively. After passing through the insertion holes 4a and 4b, the suspension wires 3a and 3b come into contact with the connecting members 5a and 5b. The suspension wires 3a and 3b are finally soldered to contact parts 12a and 12b of the wire-wound connecting members.

SUMMARY OF THE INVENTION

When two connecting members are aligned along a direction orthogonal to the extending direction of suspension wires, they will be installed in close proximity to each other. As a result, the connecting members interfere with the smooth winding of driving coil wires around each other.

The present invention provides an objective lens driving unit which solves this problem.

In an objective lens driving unit according to the present invention, when positioning connecting members provided for connecting each suspension wire with the corresponding driving coil wire, the connecting members are displaced apart from each other in the extending direction of the suspension wires. By thus increasing the spacing between the connecting members, it can be ensured that no connecting member will interfere with the winding of a driving coil wire around the other connecting member. As a result, workability is improved.

DESCRIPTION OF PREFERRED EMBODIMENT

Figure 2:
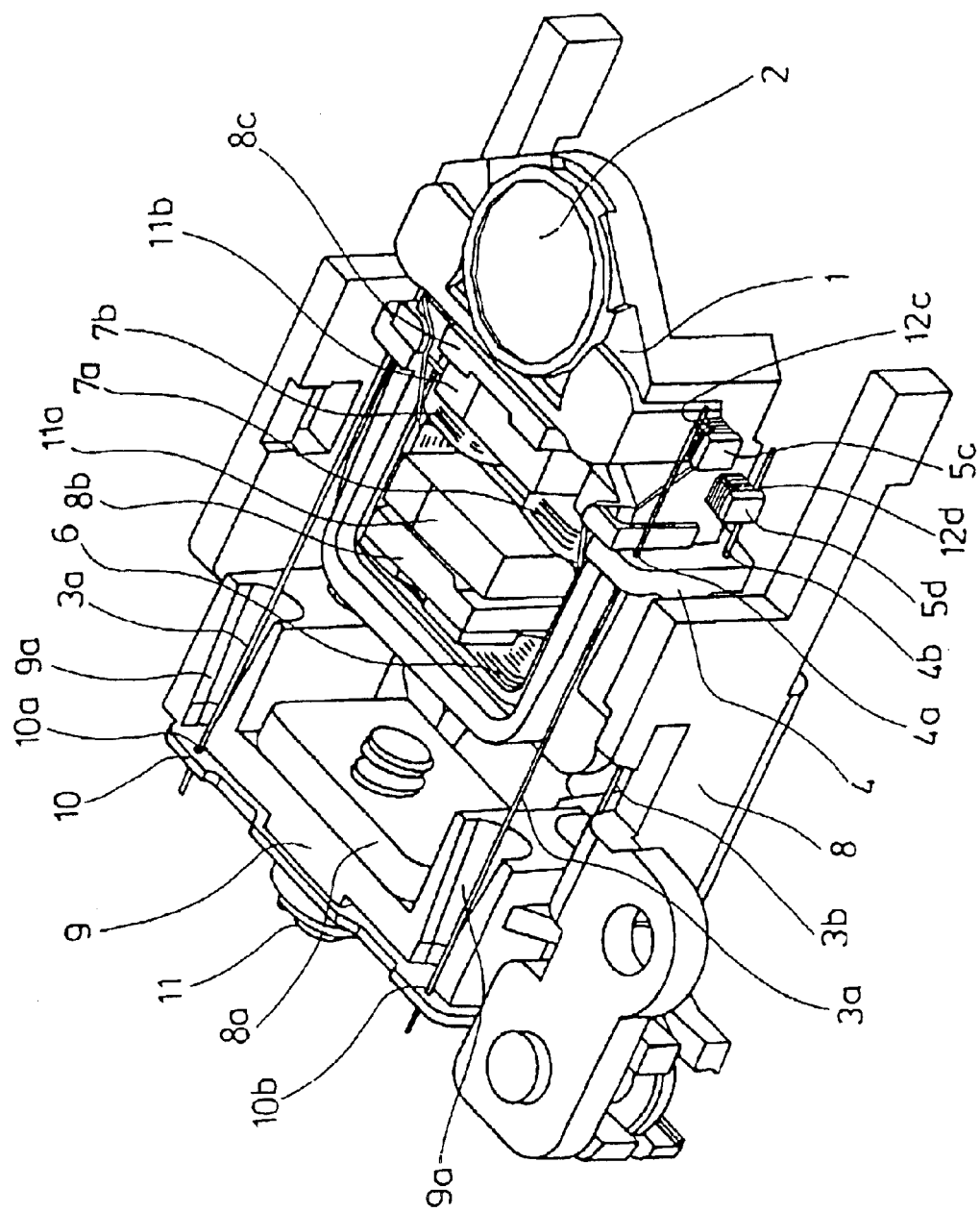
FIG. 2 is a perspective view of an objective lens driving unit according to an embodiment of the present invention.
Figure 3:
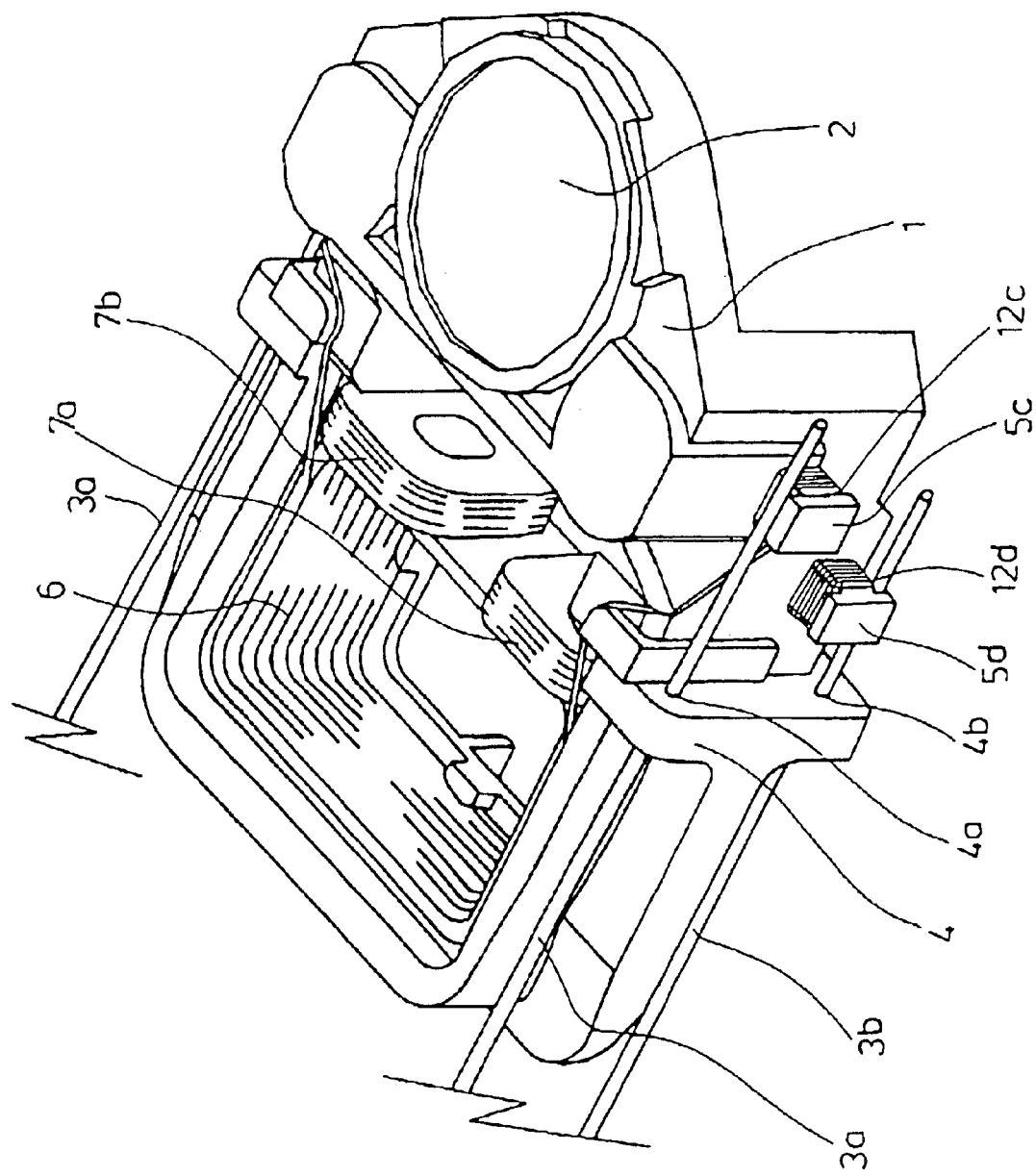
FIG. 3 is a perspective view illustrating a structure of principle components of the objective lens driving unit shown in FIG. 2.

FIG. 2 is a perspective view of an objective lens driving unit, illustrating a preferred embodiment of the present invention. FIG. 3 is a detailed view illustrating a structure of main components of the unit shown in FIG. 2.

Figure 1:
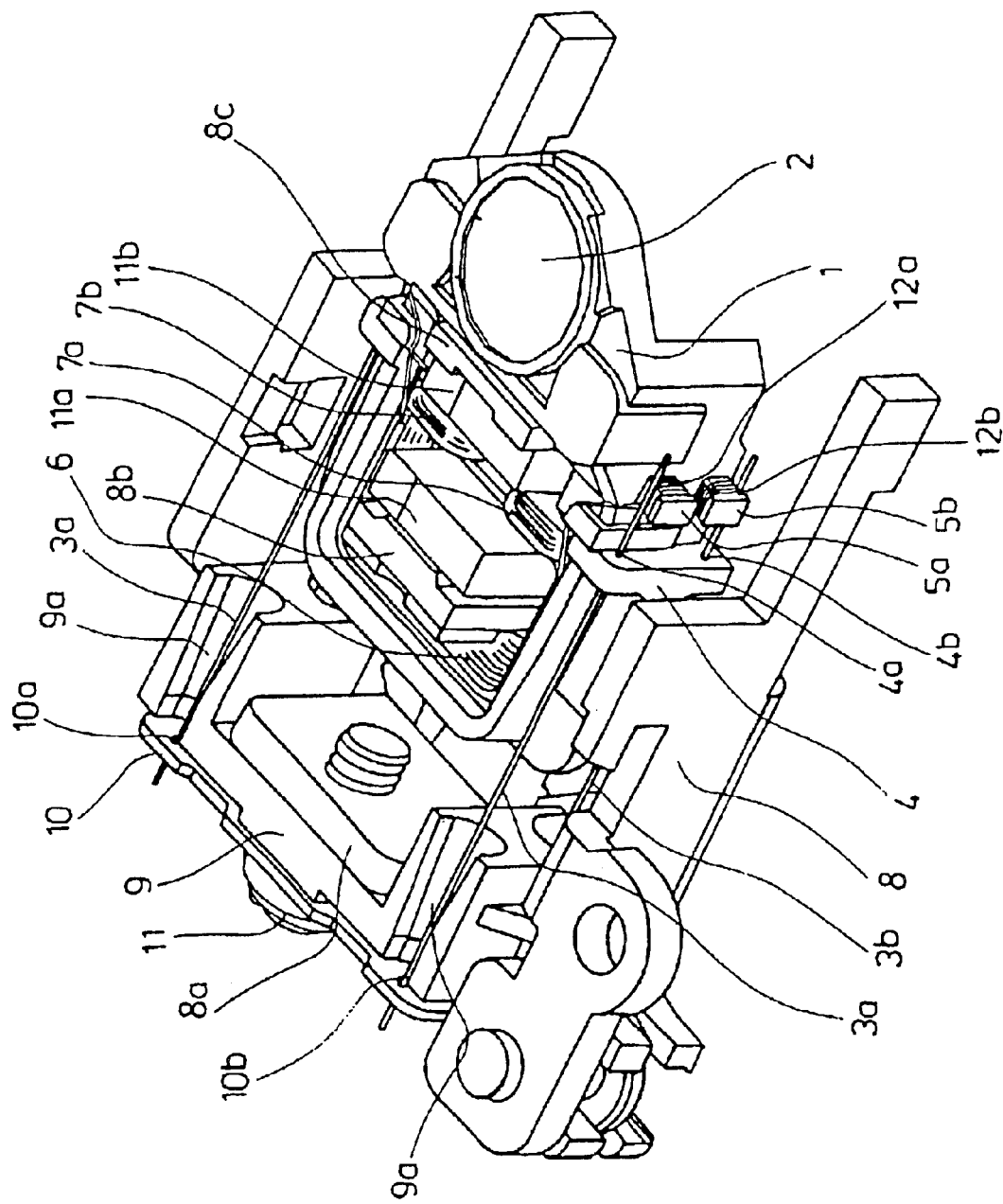
FIG. 1 is a perspective view of an example objective lens driving unit according to a related art.

Referring to FIGS. 2 and 3, components corresponding to those of the related art shown in FIG. 1 are designated by the same reference numerals, and their description will not be repeated. A feature of the present embodiment is the structure replacing the connecting members 5a and 5b and the contact parts 12a and 12b of the connecting members according to the related art.

FIG. 3 details the area where the suspension wires are secured on the lens holder. Connecting members 5c and 5d are members for connecting the suspension wires 3a and 3b with respective ends of the focusing coil 6 and of the tracking coils 7a and 7b. These connecting members 5c and 5d are used for a purpose similar to that of the connecting members 5a and 5b as described in the related art example. The connecting members 5c and 5d are positioned such that their respective distances from the support member 4 differ from each other, so as to be shifted in the extending direction of the suspension wires. Consequently, when one end of a coil wire is wound around either one of the connecting members 5c and 5d, the winding operation can be performed smoothly and without interference because the connecting members 5c and 5d are positioned such that they are spaced apart by an increased distance.

Prior to installation of the suspension wire 3a, one end of the winding for the focusing coil 6 or of the winding for the tracking coils 7a and 7b is first wound directly around the connecting member 5c. Then, the suspension wire 3a is inserted using a jig through the hole 10b provided in the printed circuit board 10 and then through the insertion hole 4a, to eventually come into contact with a contact part 12c which is a part of the connecting member 5c around which wire is wound, whereupon the suspension wire 3a is soldered to the contact part 12c.

On the other hand, prior to installation of the suspension wire 3b, one end of the winding for the focusing coil 6 or of the winding for the tracking coils 7a and 7b is first wound directly around the connecting member 5d. Then, the suspension wire 3b is inserted using a jig through a hole (not shown) provided in the printed circuit board 10 and then through the insertion hole 4b, to eventually come into contact with a contact part 12d which is a part of the connecting member 5d around which wire is wound, whereupon the suspension wire 3b is soldered to the contact part 12d.

During operation of the objective lens driving unit, a control signal is applied to a terminal of the printed circuit board 10 provided on the securing member 9. The control signal is transmitted through the suspension wires 3a and 3b to the focusing coil 6 and the tracking coils 7a and 7b. Magnetic fields are thereby generated responsive to the control signal. The focusing coil 6 and the tracking coils 7a and 7b generate forces of attraction and repulsion through interaction with the magnets 11a and 11b, thereby controlling the lens holder 1 both in the focusing direction and in the tracking direction. Positioning of the objective lens 2 fixed on the lens holder 1 can be controlled accordingly.

What is claimed is:

1. A unit for driving an objective lens fixed on a lens holder for use in an optical pickup system, the unit comprising:

driving coils mounted on the lens holder for generating a driving force to move the lens holder relative to a base;

at least two suspension wires respectively secured on opposite surfaces of the lens holder; and connecting members provided on the surfaces of the lens holder and having a one-to-one correspondence with the suspension wires, wherein one end of each driving coil wire is wound around a corresponding connecting member, the suspension wires contact respective connecting members such that the connecting members thereby provide continuity between each coil and the corresponding suspension wire, and the connecting members are positioned on one surface of the lens holder in such a manner as to be displaced apart from each other in the extending direction of the suspension wires.

2. An objective lens driving unit according to claim 1, further comprising:

support members each provided on one surface of the lens holder for securing the suspension wires, the support members each having holes through which the suspension wires may pass, the holes being arranged on the support member such that they are aligned along a direction orthogonal to the extending direction of the suspension wires, wherein the connecting members are positioned such that the respective distances by which they are separated from the holes provided on the support member as measured along the suspension wires, differ from each other.

3. An objective lens driving unit according to claim 2, wherein the suspension wires are each soldered to one end of the corresponding driving coil to establish connections therebetween.

4. An optical pickup system, comprising:

a lens holder for holding an objective lens;

driving coils mounted on the lens holder for generating a driving force to move the lens holder relative to a base;

at least two suspension wires respectively secured on opposite surfaces of the lens holder; and connecting members provided on the surfaces of the lens holder and having a one-to-one correspondence with the suspension wires, wherein one end of each driving coil wire is wound around a corresponding connecting member, the suspension wires contact respective connecting members such that the connecting members thereby provide continuity between each coil and the corresponding suspension wire, and the connecting members are positioned on one surface of the lens holder in such a manner as to be displaced apart from each other in the extending direction of the suspension wires.

5. An optical pickup system according to claim 4, further comprising:

support members each provided on one surface of the lens holder for securing the suspension wires, the support members each having holes through which the suspension wires may pass, the holes being arranged on the support member such that they are aligned along a direction orthogonal to the extending direction of the suspension wires, wherein the connecting members are positioned such that the respective distances by which they are separated from the holes provided on the support member as measured along the suspension wires, differ from each other.

6. An optical pickup system according to claim 5, wherein the suspension wires are each soldered to one end of the corresponding driving coil to establish connections therebetween.

* * * * *